United States Patent
Koeller

(10) Patent No.: US 9,288,209 B2
(45) Date of Patent: Mar. 15, 2016

(54) METHOD OF PAIRING AN ELECTRONIC APPARATUS AND A USER ACCOUNT WITHIN AN ON-LINE SERVICE

(71) Applicant: SAGEMCOM DOCUMENTS SAS, Rueil-Malmaison (FR)

(72) Inventor: Laurent Koeller, Rueil-Malmaison (FR)

(73) Assignee: SAGEMCOM DOCUMENT SAS, Rueil-Malmaison (FR)

( * ) Notice: Subject to any disclaimer, the term of this patent is extended or adjusted under 35 U.S.C. 154(b) by 0 days.

(21) Appl. No.: 14/367,072

(22) PCT Filed: Dec. 17, 2012

(86) PCT No.: PCT/EP2012/075837
§ 371 (c)(1),
(2) Date: Jun. 19, 2014

(87) PCT Pub. No.: WO2013/092514
PCT Pub. Date: Jun. 27, 2013

(65) Prior Publication Data
US 2014/0351908 A1    Nov. 27, 2014

(30) Foreign Application Priority Data
Dec. 19, 2011    (FR) ...................................... 11 61954

(51) Int. Cl.
*H04L 29/06*    (2006.01)
*G06Q 30/02*    (2012.01)

(52) U.S. Cl.
CPC ............... *H04L 63/10* (2013.01); *G06Q 30/02* (2013.01)

(58) Field of Classification Search
CPC ................................. H04L 63/10; G06Q 30/02
USPC .............................................................. 726/6
See application file for complete search history.

(56) References Cited

U.S. PATENT DOCUMENTS

2007/0044143 A1*  2/2007  Zhu et al. ........................... 726/8
2014/0220929 A1*  8/2014  Ekberg et al. .................. 455/406
2014/0297877 A1*  10/2014  Sabatier et al. ................ 709/227

OTHER PUBLICATIONS

Apr. 2, 2013 Search Report issued in International Patent Application No. PCT/EP2012/075837 (with translation).
Apr. 2, 2013 Written Opinion issued in International Patent Application No. PCT/EP2012/075837 (with translation).
EPO: "Notice from the European Patent Office dated Oct. 1, 2007 concerning business methods;" Journal of the European Patent Office; Nov. 1, 2007; vol. 30; No. 11; XP007905525; pp. 592-593.

* cited by examiner

*Primary Examiner* — Kambiz Zand
*Assistant Examiner* — Benjamin Kaplan
(74) *Attorney, Agent, or Firm* — Oliff PLC

(57) ABSTRACT

The present invention relates to the field of methods for pairing an electronic apparatus and a user account within an online service. The invention describes a method of pairing in which the fleet management service generates a short identifier which it provides to the electronic apparatus during the initialization phase. The apparatus displays said identifier. The user copies this identifier into the interface for accessing the portal of the online service. The online service can then provide an association between this identifier and a user account to the fleet management service. The code generated being displayed in a readable manner and being shorter than a serial number, its copying by the user is facilitated and the risk of transcription error is minimized.

12 Claims, 3 Drawing Sheets

METHOD OF PAIRING AN ELECTRONIC APPARATUS AND A USER ACCOUNT WITHIN AN ON-LINE SERVICE

The present invention concerns the field of methods for associating an electronic apparatus with a user account within an online service.

The invention has been implemented in the field of implementation of a fleet of scanners and online services for archiving and processing digital documents. It will be clear to a person skilled in the art that the invention can be used in a more general context for a larger quantity of electronic apparatuses and all types of service.

The fleet of electronic apparatuses is administered by a frontal apparatuses management service that serves as a relay between the apparatuses and the online services. A person skilled in the art will understand that the terms "online service" and "frontal apparatuses management service" correspond to data processing devices or equipment suitable for implementing a predefined function or a set of predefined functions, such as archiving, processing digital documents, or the like. The architecture of the system is illustrated by FIG. 1. An electronic apparatus of the fleet 1.1 enables using one or more online services from a plurality of services 1.3, 1.4, 1.5 and 1.6. A service for managing the fleet 1.2 serves as a relay between the apparatus 1.1 and the online services 1.3, 1.4, 1.5 and 1.6. The user of the electronic apparatus 1.1 has an account on the online service, for example on the service 1.3. He can manage his account by connecting directly to the service from a computer 1.7. Typically, the user opens an account on the online service from the computer 1.7. Once the account is open, when the user uses his electronic apparatus, the latter automatically connects to the service managing the fleet 1.2, which relays automatically to the associated online service.

In order for the system to operate, the fleet management service must be able to associate an electronic apparatus identifier that it will receive in the communications coming from the apparatus and a user account with an online service.

Giving a user identifier and a password directly on the electronic apparatus for associating this apparatus with the user account is known. The apparatus can then transmit this information to the fleet management service, which stores the association. However, this method requires the electronic apparatus to have a peripheral for entering this information. This is not the case with all apparatuses, and in particular with the scanners of the example embodiment of the invention.

Using the serial number of the electronic apparatus is also known. This number is normally inscribed on the apparatus. The user can then transfer it via a portal of the online service using his access 1.7. The online service then retrieves the identifier and supplies to the fleet management service the association between the identifier of the electronic apparatus and the client account. This method has the drawback that the serial number is often inscribed in very small characters. In addition, since this number is unique within a large stock of equipment, it is relatively long, typically more than twenty alphanumeric characters. Manual copying by the user is therefore laborious and subject to transcription errors.

The invention aims to solve the above problems with an association method wherein the fleet management service generates a short identifier that it supplies to the electronic apparatus during the initialisation phase. Said apparatus displays said identifier. The user copies this identifier into the interface for accessing the portal of the online service. The online service can then provide an association between this identifier and a user account to the fleet management service. The code generated being displayed legibly and being much shorter than a serial number, copying thereof by the user is facilitated and the risk of transcription error is minimised.

The invention concerns a method for pairing between an electronic apparatus unique identifier and a user account identifier within an online service by said electronic apparatus, a fleet management service serving as a relay between said apparatus and said online service, which comprises a step of triggering the method; a step of sending a pairing request to the fleet management service; a step of receiving a response containing a token consisting of a unique identifier generated by the fleet management service; a step of displaying the received token; a step of awaiting reception of a pairing confirmation and a step of receiving a pairing confirmation sent by the fleet management service.

According to a particular embodiment of the invention, the step of triggering the method is an automatic step performed when said apparatus is brought into service.

According to a particular embodiment of the invention, the step of triggering the method is an action by the user.

According to a particular embodiment of the invention, the step of awaiting reception of a pairing confirmation is an active awaiting step with the periodic sending of a pairing confirmation request sent by the apparatus to the fleet management service.

The invention also concerns a method for pairing between an electronic apparatus unique identifier and a user account identifier with an online service, a fleet management service serving as a relay between said apparatus and said online service, by said fleet management service, which comprises a step of receiving the pairing request sent by an electronic apparatus which contains a unique identifier of said apparatus; a step of generating a unique token and storing the association between the generated unique token and the received unique apparatus identifier; a step of sending a response to the received request that contains the generated unique token; a step of receiving from the online service an association between a user account identifier and a token; a step of generating the association between the unique identifier of the electronic apparatus and the user account identifier and a step of sending a pairing confirmation to the electronic apparatus.

According to a particular embodiment of the invention, the step of generating the association between the unique identifier of the electronic apparatus and the user account identifier comprises a step of checking that the received token does indeed correspond to a generated token awaiting association and a step of associating between the stored apparatus identifier with the received user account identifier, the token having served as a link between the two.

According to a particular embodiment of the invention, the method also comprises a step of triggering a time countdown when a token is generated and a step of invalidating the token if no association is received between this token and a user account at the end of the countdown.

The invention also concerns an electronic apparatus that comprises a unique apparatus identifier; means for triggering said method; means for sending a pairing request to a fleet management service; means for receiving a response containing a token consisting of a unique identifier generated by the fleet management service; means for displaying the received token; means for awaiting reception of a pairing confirmation and means for receiving a pairing confirmation sent by the fleet management service.

The invention also concerns an information processing device for implementing a fleet management service serving as a relay between an electronic apparatus and an online service, which comprises means for receiving a pairing request sent by the electronic apparatus which contains a unique identifier of said apparatus; means for generating a unique token and storing the association between the generated unique token and the received apparatus unique identifier; means for sending a response to the received request that contains the generated unique token; means for receiving from the online service an association between a user account identifier and a token; means for generating the association between the unique identifier of the electronic apparatus and the user account identifier; means for sending a pairing confirmation to the electronic apparatus.

The features of the invention mentioned above, as well as others, will emerge more clearly from a reading of the following description of an example embodiment, said description being given in relation to the accompanying drawings, among which:

It is assumed that the user has created his user account within the required online service. The user is therefore the owner of an account and has an identifier for this account. Advantageously, the account identifier is the connection user name, which may be his email address. However, the user account identifier may be any identifier defined by the online service that enables a unique and certain identification of the user account.

Next, the user must perform an operation of pairing between at least one electronic apparatus and his user account. This pairing is necessary so that the messages sent by the apparatus to the fleet management service are redirected to the online service required and so as to associate this service with the appropriate user account.

Figure 1:
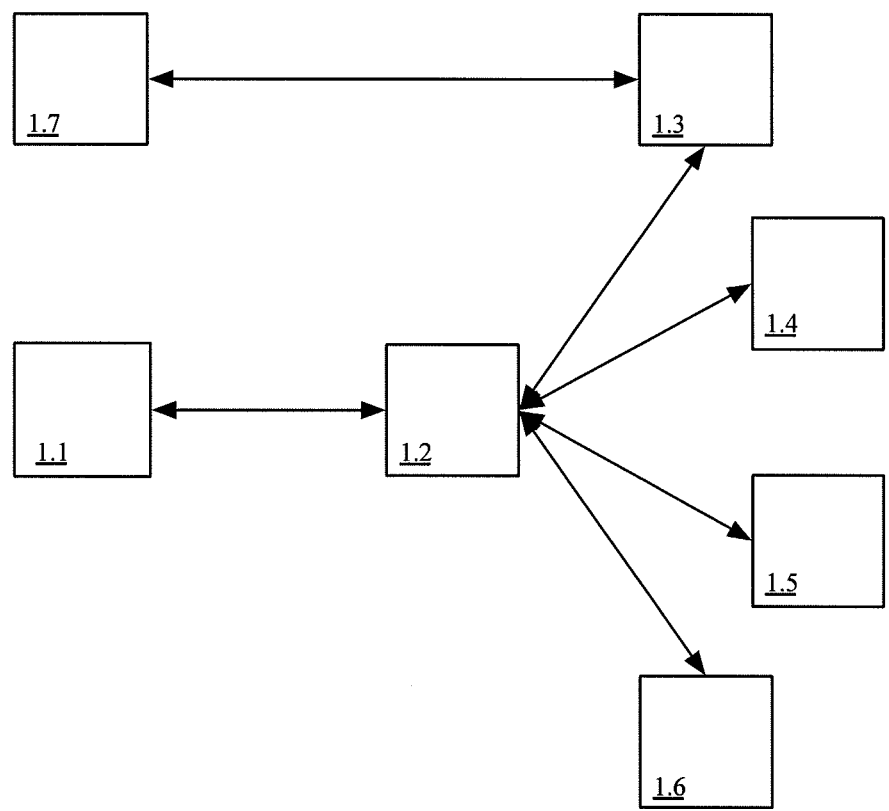
FIG. 1 illustrates the architecture of an example embodiment of the system.
Figure 2:
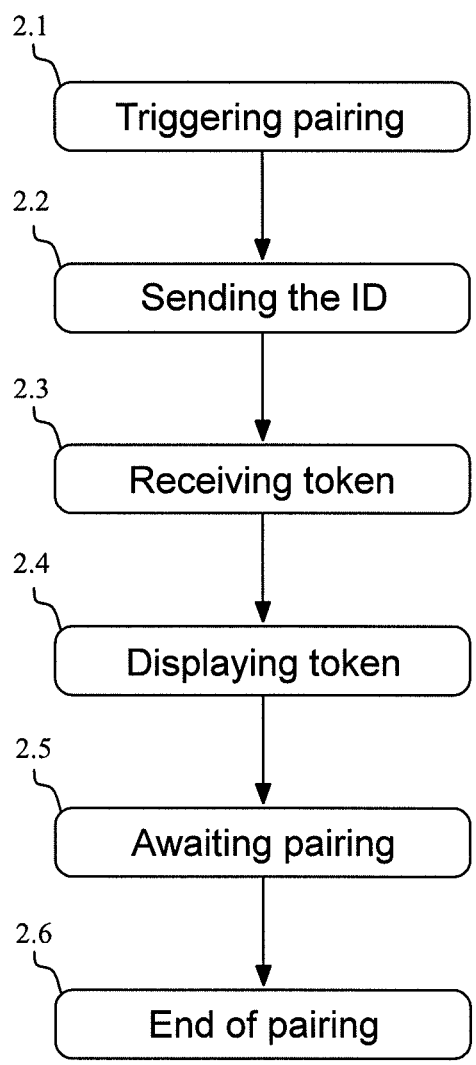
FIG. 2 illustrates the method of pairing by an electronic apparatus according to an example embodiment of the invention.

The pairing method as implemented by the electronic apparatus is illustrated by FIG. 2.

During a step 2.1, the pairing method is triggered. This triggering may be automatic on bringing the apparatus into service or triggered by an action by the user, for example pressing on a dedicated key.

During a step 2.2, the apparatus sends a pairing request to the fleet management service. This request contains a unique identifier of the apparatus. This identifier is an identifier that is sent by the apparatus during all its communications with the fleet management service. It is through this identifier that the fleet management service identifies the origin of the communications that reach it. It is possible for example to use the MAC address, meaning the layer 2 network address that is normally uniquely defined for any apparatus communicating over a network of IP (Internet Protocol) type. However, any other identifier may be used, provided that it enables the fleet management service to make a sure identification of the apparatus sending a message.

During a step 2.3, the apparatus receives a response containing a token consisting of a unique identifier generated by the fleet management service. This token is advantageously short since its lifetime is limited. This is because, at the end of the pairing procedure, the fleet management service is advised that the token has fulfilled its mission and can consequently reuse the same token value for a new pairing. In the example embodiment of the invention, the token consists of a numeric code with four digits. 9999 different token values prove to be amply sufficient for the operation of the pairing method in this example.

During a step 2.4, the apparatus displays the received token. This display takes place typically on a screen of said apparatus. Alternatively, it is also possible for the apparatus to automatically print the token. The purpose is to enable the user to read the token and to transfer it into the management interface of the online service. The latter is therefore in a position to associate the token with a user account and to send this association to the fleet management service.

During a step 2.5, the apparatus waits until it receives confirmation of the pairing. This waiting step may be an active awaiting step with the periodic sending of a pairing confirmation request sent by the apparatus to the fleet management service. The latter responds to this request with a message that means that it is itself awaiting reception of an association relating to the token that it has generated. In another embodiment, this waiting is passive, and the apparatus then sends no message.

During a step 2.6, the apparatus receives a pairing confirmation sent by the fleet management service. This confirmation coming in response to a request in the embodiment where the waiting is active or spontaneously sent by the fleet management service to the apparatus in the case where the waiting is passive.

Figure 3:
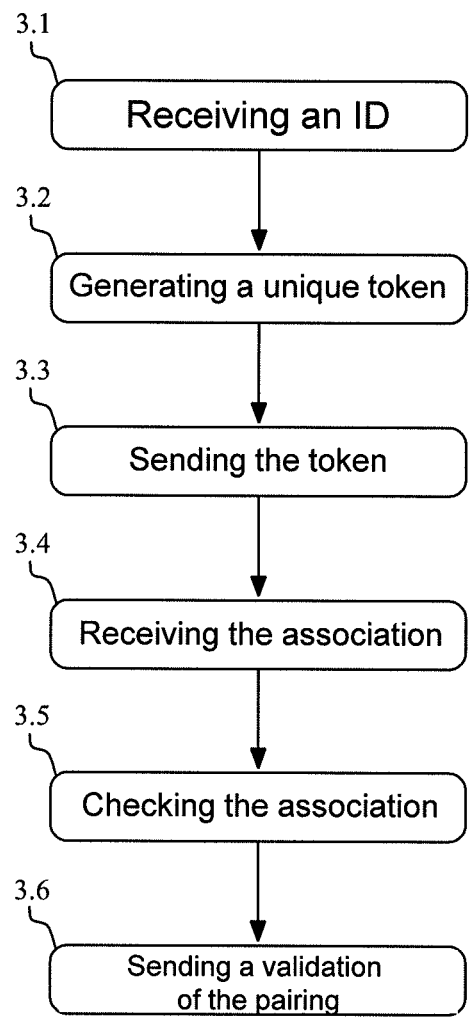
FIG. 3 illustrates the method of pairing by the service managing the fleet of apparatuses according to an example embodiment of the invention.

The pairing method as implemented by the fleet management service is illustrated by FIG. 3.

During a step 3.1, the fleet management service receives the pairing request sent by an electronic apparatus which contains a unique identifier of this apparatus.

During a step 3.2, the fleet management service generates a unique token and stores the association between the generated unique token and the received apparatus unique identifier.

During a step 3.3, the fleet management service sends a response to the received request which contains the generated unique token.

During a step 3.4, the fleet management service receives from the online service an association between a user account identifier and a token. Indeed, the user having filled in his account with the token displayed by the apparatus, the online service has received the token and has been able to generate this association.

During a step 3.5, the fleet management service generates the association between the unique identifier of the electronic apparatus and the user account identifier. For this purpose, it checks that the received token does indeed correspond to a generated token awaiting association. In this case, it finds the stored association between this token and an electronic apparatus unique identifier. It can then associate the stored apparatus identifier with the user account identifier received, the token having served as a link between the two. If the verification of the token fails and the one received from the online service does not correspond to any generated token awaiting association, an error message is sent to the online service.

During a step 3.6, the fleet management service then sends a pairing confirmation to the electronic apparatus.

Advantageously, the fleet management service triggers a time countdown when it has generated a token. If it does not receive an association between this token and a user account at the end of the countdown, it invalidates the token. The reception of an association between an expired token and a user account implies an error response from the fleet management service. It is thus ensured that no token value remains indefinitely reserved in the system if the user never makes the pairing. The user must then make a new pairing.

Once the pairing is achieved, the fleet management service is in a position to redirect all the traffic issuing from the electronic apparatus and therefore marked by the unique identifier of the apparatus to the appropriate online service accompanied by the user account identifier.

The invention claimed is:

1. A method of pairing between a unique identifier of an electronic apparatus and an identifier of a user account within an online service, the method being performed by said electronic apparatus, a fleet management service serving as a relay between said electronic apparatus and said online service, wherein the method comprises:
   sending a pairing request to the fleet management service;
   receiving a response to the pairing request, the response containing a token consisting of a unique identifier generated by the fleet management service;
   displaying the received token;
   awaiting reception of a pairing confirmation; and
   receiving the pairing confirmation from the fleet management service.

2. The method according to claim 1, wherein the method is automatically triggered when said electronic apparatus is brought into service.

3. The method according to claim 2, wherein awaiting reception of a pairing confirmation is an active awaiting step comprising periodically sending a pairing confirmation request to the fleet management service.

4. The method according to claim 1, wherein the method is triggered by an action by the user.

5. The method according to claim 4, wherein awaiting reception of a pairing confirmation is an active awaiting step comprising periodically sending a pairing confirmation request to the fleet management service.

6. The method according to claim 1, wherein awaiting reception of a pairing confirmation is an active awaiting step comprising periodically sending a pairing confirmation request to the fleet management service.

7. A method of pairing between a unique identifier of an electronic apparatus and an identifier of a user account within an online service, a fleet management service serving as a relay between said electronic apparatus and said online service, the method being performed by said fleet management service, wherein the method comprises:
   receiving a pairing request from the electronic apparatus, the pairing request containing a unique identifier of said electronic apparatus;
   generating a unique token and storing an association between the generated unique token and the received unique identifier of the electronic apparatus;
   sending a response to the received request, the response containing the generated unique token;
   receiving from the online service an association between a user account identifier and a token;
   generating the association between the unique identifier of the electronic apparatus and the user account identifier; and,
   sending a pairing confirmation to the electronic apparatus.

8. The method according to claim 7, wherein generating the association between the unique identifier of the electronic apparatus and the user account identifier comprises:
   checking that the received token does indeed correspond to a generated unique token awaiting association; and
   associating the stored unique identifier of the electronic apparatus with the received user account identifier, the unique token having served as a link between the two.

9. The method according to claim 8, wherein the method further comprises:
   triggering a time countdown when the unique token is generated;
   invalidating the generated unique token if no association between said unique token and a user account is received before the countdown ends.

10. The method according to claim 7, wherein the method further comprises:
    triggering a time countdown when the unique token is generated;
    invalidating the generated unique token if no association between said unique token and a user account is received before the countdown ends.

11. An electronic apparatus having a unique identifier, the electronic apparatus being adapted to perform the acts of:
    sending a pairing request to a fleet management service;
    receiving a response to the pairing request, the response containing a token consisting of a unique identifier generated by the fleet management service;
    displaying the received token;
    awaiting reception of a pairing confirmation; and
    receiving the pairing confirmation from the fleet management service.

12. Information processing device for implementing a fleet management service serving as a relay between an electronic apparatus and an online service, the information processing device being adapted to perform the acts of:
    receiving a pairing request from the electronic apparatus, the pairing request containing a unique identifier of said electronic apparatus;
    generating a unique token and storing the association between the generated unique token and the received unique identifier of the electronic apparatus;
    sending a response to the received pairing request, the response containing the generated unique token;
    receiving from the online service an association between a user account identifier and a token;
    generating the association between the unique identifier of the electronic apparatus and the user account identifier; and
    sending a pairing confirmation to the electronic apparatus.

* * * * *

UNITED STATES PATENT AND TRADEMARK OFFICE
CERTIFICATE OF CORRECTION

PATENT NO. : 9,288,209 B2  
APPLICATION NO. : 14/367072  
DATED : March 15, 2016  
INVENTOR(S) : Laurent Koeller Page 1 of 1

It is certified that error appears in the above-identified patent and that said Letters Patent is hereby corrected as shown below:

On the Title Page, Item (73) Assignee: delete "SAGEMCOM DOCUMENT SAS" and insert --SAGEMCOM DOCUMENTS SAS--, therefore.

Signed and Sealed this  
Thirty-first Day of May, 2016

Michelle K. Lee  
*Director of the United States Patent and Trademark Office*